United States Patent
Sturms et al.

(10) Patent No.: US 7,503,075 B2
(45) Date of Patent: Mar. 10, 2009

(54) ACCESS TRIMMED USER INTERFACE

(75) Inventors: James R. Sturms, Seattle, WA (US);
Randy D. Thomson, Redmond, WA (US); Ziyi Wang, Redmond, WA (US);
Hongzhou Ma, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 790 days.

(21) Appl. No.: 11/035,024

(22) Filed: Jan. 12, 2005

(65) Prior Publication Data

US 2006/0156031 A1    Jul. 13, 2006

(51) Int. Cl.
G06F 21/22   (2006.01)
G06F 17/30   (2006.01)
(52) U.S. Cl. .................. 726/28; 726/1; 726/2; 707/9
(58) Field of Classification Search .................. None
See application file for complete search history.

(56) References Cited

U.S. PATENT DOCUMENTS

| | | | |
|---|---|---|---|
| 5,544,360 A * | 8/1996 | Lewak et al. .................. 707/1 |
| 5,996,011 A * | 11/1999 | Humes ........................ 709/225 |
| 6,044,401 A * | 3/2000 | Harvey ........................ 709/225 |
| 6,105,027 A * | 8/2000 | Schneider et al. .............. 707/9 |
| 6,539,430 B1 * | 3/2003 | Humes ........................ 709/225 |
| 6,880,005 B1 * | 4/2005 | Bell et al. .................... 709/225 |
| 6,950,818 B2 * | 9/2005 | Dennis et al. .................. 707/3 |
| 7,086,085 B1 * | 8/2006 | Brown et al. .................... 726/7 |
| 7,139,736 B2 * | 11/2006 | Stefik et al. .................... 705/51 |
| 7,213,269 B2 * | 5/2007 | Orthlieb et al. ................ 726/33 |
| 7,246,201 B2 * | 7/2007 | Wu ............................. 711/119 |
| 7,278,168 B1 * | 10/2007 | Chaudhury et al. ............ 726/30 |
| 7,356,840 B1 * | 4/2008 | Bedell et al. .................. 726/13 |

* cited by examiner

*Primary Examiner*—Christopher A Revak
(74) *Attorney, Agent, or Firm*—Merchant & Gould P.C.

(57) ABSTRACT

Reducing the number of inquiries required to determine access rights accorded to documents, in particular documents stored at a Web site, is disclosed. Upon receipt of a request for documents, a list of the documents is opened by the receiving server and data denoting the user access level of every document on the list is determined. Then, the resulting series of access levels is filtered to remove any access levels not available to the requestor. Next, a document query, including as a condition that any returned list of documents only include documents having an access level included on the filtered series of access levels, is generated. The resulting document data is then embedded in a Web page and sent to the requestor.

21 Claims, 5 Drawing Sheets

| USERS |
|---|
| U1 |
| U2 |
| ⋮ |
| UN |

Fig. 5A.

| ROLES | |
|---|---|
| R1 | P1 |
| R2 | P2 |
| ⋮ | ⋮ |
| RN | PN |

Fig. 5B.

| ROLE ASSIGNMENTS | | |
|---|---|---|
| U1 | R1 | S1 |
| U2 | R1 | S1 |
| U2 | R2 | S2 |
| ⋮ | ⋮ | ⋮ |
| UN | RN | SN |

Fig. 5C.

| PERMS | |
|---|---|
| S1 | U1, P1 |
|    | U2, P2 |
| S2 | U2, P2 |
|    |        |
| ⋮  | ⋮      |
| SN | U1, PX |
|    | UN, PN |

Fig. 5D.

| DOCUMENTS | | |
|---|---|---|
| D1 | | S1 |
| D2 | | S2 |
| ⋮ | | ⋮ |
| DN | | SN |

Fig. 5E.

ACCESS TRIMMED USER INTERFACE

FIELD OF THE INVENTION

The present invention relates to computer software and, more particularly, to a computer-implementable method of restricting access to one or more items renderable on a display.

BACKGROUND OF THE INVENTION

While the present invention was developed for use in connection with Web pages and is described in connection with the Internet, it is to be understood that the invention may also find use in other environments.

A computing device, such as a personal computer, personal digital assistant (PDA), cell phone, or similar device, which can be connected to the Internet, has access to a vast number of Web pages distributed by Internet Web sites. A typical Web page presents a plurality of discrete visual items to a user. Some types of visual items (also called documents because they are stored in separate identifiable files) include, but are not limited to, text labels, pictorial icons, buttons, menus and menu items, text entry fields, and windows.

A Web server is a software program that provides, or serves, Web pages to computing devices that are able to access the Web server via the Internet or other network connection. In many implementations, a Web server is a single instance of a single program running on a single computing device; however, a more capable and robust Web server may be implemented as multiple coordinated instances of the same program running on one or more computing devices. However a Web server is implemented, a Web server takes in requests received via the Internet and processes these requests. If a request contains appropriate information arranged in a proper, predetermined format, the Web server uses the information in the request to determine what action or actions to take in response to the user's request.

Web server action often involves collecting information from the data stores that support the Web server. Such information may be assembled to form a "response." The response is passed back to the requesting computer via the Internet or other network. The response is normally in the form of a Web page. In the Web browser running on the requesting computer, i.e., the host computing device, this new Web page may replace the original Web page or a new page may be presented in another browser window.

Some Web servers and the data stores that support Web servers are used to allow "teams" of users to share documents, in particular text documents. An example of such Web server products is the Microsoft® SharePoint product and associated technologies. A SharePoint team Web site is a customizable Web site with features that help a team work together. The Web site has pages for document libraries, announcements, team events, etc. Only users or groups of users specified by the Web site creator can use a SharePoint Web site. Teams can take various forms. For example, a team may include a supervisor and a plurality of employees devoted to a particular product or business function such as the sales or accounting department of a corporation.

For various reasons, including but not limited to, security and user convenience, it is often useful to restrict access to some of the documents available in a given Web site, such as a SharePoint Web site. For example, a particular Web page site, or collection of Web sites may include a variety of employee information documents, such as an employee address document that lists employee addresses, an employee home telephone number document that lists employee home telephone numbers, and an employee pay document that lists the salaries of employees. While it may be desirable for a team "leader" to have access to all three documents, it may be undesirable for other members of the team to have access to the employee pay document, for example. In this example, the members of the team other than the leader are only allowed access to two of the three documents. Access enforcement, which takes place on the Web server, results in the non-accessible document not being returned to members of the team, other than the team leader.

In order for the Web server software to enforce the access, e.g., security, measure, the Web server software must gather security rights information about the three documents. The information about the documents is often in another data store, usually a database, which may be on another computer. In the past, gathering such information has required the Web server to send a query to the database for each of the three documents in order to determine the access rights for each document. Each query requires a finite amount of computing resources. Since Web servers often distribute hundreds or even thousands of Web page responses within a few seconds, the cumulative negative effect of these queries on computing resources can be significant. The cumulative negative effect can severely overload the memory, computing, and communication capacity of the Web server, thereby reducing the performance of the Web server.

What is needed is a way of reducing the number of queries required to determine the security or other access restrictions applicable to requested documents. While this result can be achieved by changing how a database operates, changing how a database operates is undesirable. A more efficient and desirable solution is to change how the data stored in a database is obtained without changing the operation of the database itself. The present invention is directed to providing such a solution.

SUMMARY OF THE INVENTION

The present invention is directed to reducing the number of inquiries required to determine access rights accorded to documents, in particular documents stored at a Web site, by changing how data stored in a database is obtained, as opposed to changing how the database itself operates. More specifically, upon receipt of a request for documents, a list of the documents is opened by the receiving server and data denoting the user access level of every document on the list is determined. Then, the resulting series of access levels is filtered to remove any access levels not available to the requester. Next, a document query, including as a condition that any returned list of documents only include documents having an access level included on the filtered series of access levels, is generated. The resulting document data is then embedded in a Web page and sent to the requestor.

In accordance with other aspects of this invention, in order to determine the documents available to the user, a table that associates users with access level (also called scope) information is accessed. Documents are only retrieved if they are determined to be accessible according to the scope information.

In one exemplary embodiment of this invention, upon receiving a request for documents from a Web browser, the documents on the list are identified and the scope (user access level) of each document is determined by a Web server. The resulting series of scope or access levels is filtered based on information in a table that relates users and scope information to eliminate documents with scopes that are not available to the requesting user. A list of the remaining documents is then generated.

In accordance with other aspects of this invention, the page is a Web page.

In accordance with yet other aspects of this invention, a client computing device running a Web browser produces the request for documents and a Web server receives and processes the request for the documents.

In accordance with still other aspects of this invention, the documents and the table that relates users and scope information are stored on a data server.

As will be readily appreciated from the foregoing description, the present invention is applicable to a Web page serving system in which the information required to restrict access to one or more documents is not stored with the items themselves. Rather, preferably, the information is computed and stored in a filter that relates scopes to one or more users. While the invention is described herein in connection with Web pages, it is to be understood that the invention can be used with pages other than Web pages and/or in networked environments other than the Internet. Further, the present invention can be used to restrict access to items based on access information other than security information.

BRIEF DESCRIPTION OF THE DRAWINGS

The foregoing aspects and many of the attendant advantages of the present invention will become more apparent by reference to the following detailed description, when taken in conjunction with the accompanying drawings, wherein:

FIG. 5A is a diagram illustrating an exemplary User's data table containing references to the users recognized by a system;

FIG. 5B is a diagram illustrating an exemplary Roles data table containing references to the roles with which a user might be associated;

FIG. 5C is a diagram illustrating an exemplary RoleAssignments data table that associates users, roles, and scopes;

FIG. 5D is a diagram illustrating an exemplary Perms (Permissions) data table that is precalculated and thus a more quickly accessible form of the RoleAssignments table; and FIG. 5E is a diagram illustrating an exemplary Documents data table that associates documents with scope.

DETAILED DESCRIPTION

A computer-implementable method that efficiently restricts access to one or more documents included in a list of documents requested by a user is provided. Unlike solutions in the prior art, the impact of requests for items is reduced by reducing the number of database queries required to identify which documents on the list are accessible by a requesting user. Depending on the number of documents required to fulfill the original document request, the number of database queries for a given request may be reduced to one.

Figure 1:
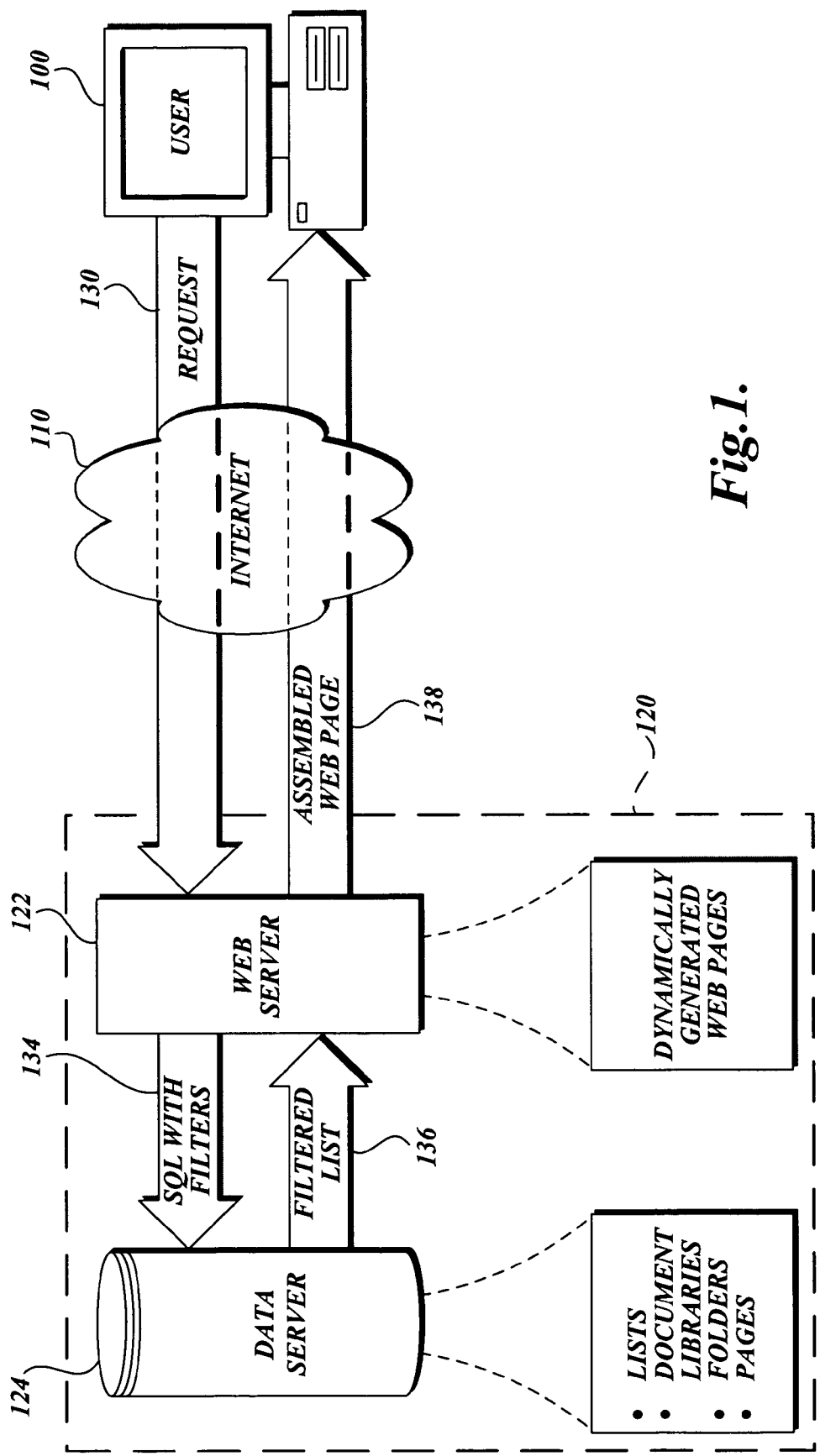
FIG. 1 is a pictorial diagram illustrating the major components of an Internet environment suitable for implementing an exemplary embodiment.

FIG. 1 illustrates the components of an exemplary environment in which the invention may be used. FIG. 1 includes three main components—a user (client) computing device, such as a personal computer (PC) 100 running a Web browser; and a Web server environment 120 that includes a Web server 122 and a data server 124. The personal computer 100 is coupled to the Web server 122 via the Internet. Rather than a personal computer, the user computing device 100 may take the form of other well known computing devices, such as personal digital assistants (PDAs), cellular telephones, etc., suitable for operating a Web browser.

A Web browser displays one or more Web pages. As well known to those skilled in the art, a Web page presents one or more visual items such as text, pictorial icons, buttons, menus, text entry fields, etc. To present a Web page, the Web browser reads a description of the Web page, extracts certain information from the description of the Web page, and uses the extracted information to render the Web page into the Web browser window, or an area of the Web browser window. The description of the Web page is often contained in one or more "documents." A document is a self-contained collection of data, usually intended to be read and/or manipulated by human beings. Documents are stored in computer files that are given a unique reference, which is used to retrieve the document. Documents and the files that contain them can be generated by computer programs or a user may produce a document during the execution of computer application programs. Computer application programs include, but are not limited to, word processor programs, spreadsheet programs, and drawing programs. Examples of types of documents are, but are not limited to, formatted text documents, spreadsheet data documents, and graphic documents.

A document that contains a description of a Web page is sometimes referred to as a Web page document. The description of a Web page is often made up of one or more descriptions of visual items which will be rendered when the page is rendered. The description of a Web page contained in a Web page document is written in computer languages referred to as "markup languages" such as, but not limited to, extensible Markup Language (XML) and HyperText Markup Language (HTML) Many markup languages allow the inclusion of one or more documents inside of an enclosing document, i.e., one document may contain one or more other documents. When one document is included in another document, the included document is referred to as the "embedded" document. Since one or more Web page documents may use the same embedded document, the Web pages rendered from the Web page documents that contain the same embedded document or documents, may present the same or similar items. An important feature of a Web browser in the environment of an embodiment of the invention is that if an embedded document is inaccessible, the document that contains the embedded document is able to be rendered without the inaccessible document being rendered, i.e., the containing document is rendered as though the items included in the embedded document did not exist.

Before the interactions which lead to the rendering of a Web page, and which are illustrated in FIG. 1, can take place, a user is normally required to "log into" or "log on to" a computing device or computing system. Logging a user into a computing system is one of the measures used to limit access to, e.g., enforce the security of, a computing device or a server by requiring that users identify themselves before gaining access to the computing device or server. For purposes of brevity, this discussion will focus on the situation in which the user uses a "personal" or "desktop" computer 100 to log on to a Web server 122. However, those skilled in the art will appreciate that a similar process may be used to log onto to computing devices such as desktop computers (PCs), personal digital assistants (PDAs), cellular telephones, and the like.

Figure 4:
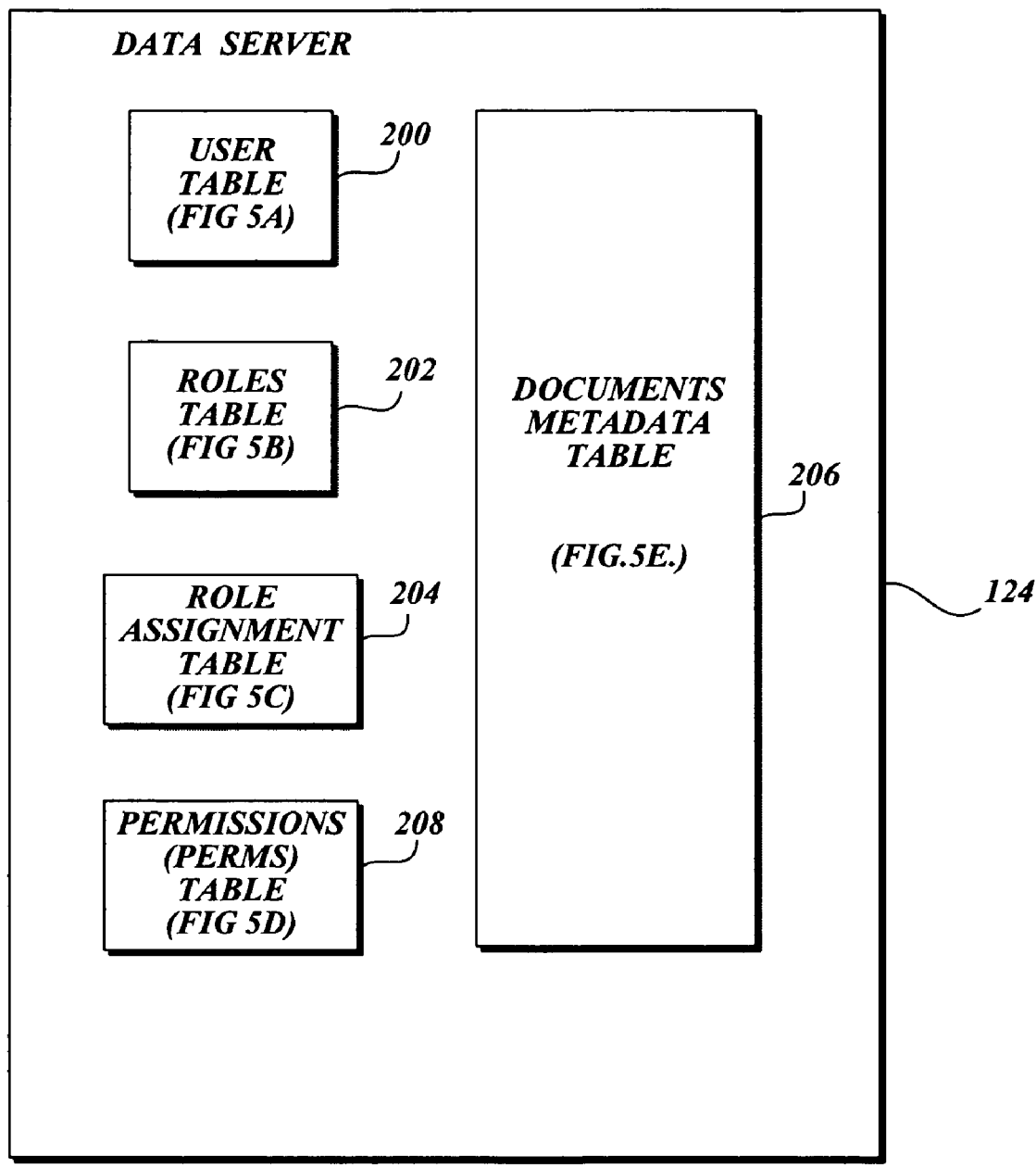
FIG. 4 is a pictorial diagram illustrating relevant content of the data server included in FIG. 1.

Gaining access to a server by using a computing device connected to a Web server 122 over a network connection, e.g., the Internet 110, is often done by having the Web server present a Web page to the user. The Web page contains a set of text fields in which the user enters a name, a password, and perhaps other identifying information. When this information is submitted to the Web server, the Web server, or a computing device supporting the Web server, initiates a search to ensure that a user with the submitted name exists. The list of users may be stored in user's table, such as the table shown in FIG. 5A that includes user identifiers, U1, U2 . . . UN on the left side and corresponding user identification information on the right side. The data table shown in FIG. 5A may be stored in the data server 124 as shown in FIG. 4. Likewise, data tables shown in FIGS. 5B, 5C, 5D, and 5E, all of which are described below, may also be stored in the data server as illustrated in FIG. 4.

The Web server compares the submitted information with the information the Web server has stored for users. If the submitted information correlates with the information associated with a valid user name, the user is allowed access to the computing device. All interaction the user has with the computing device is enabled by the identity assigned to the user, e.g., U1, U2 . . . UN (FIG. 5A). It is this identity, in concert with other data, that is used in the manner described below to control access to requested documents.

After a user has logged into the Web server, a Web page is presented to the user in the Web browser. As was described earlier, such a Web page may contain one or more text fields and/or computer actionable items, such as button images. As before, text may be entered into one or more text fields and an action, such as the clicking of a button image on a Web page, as shown in FIG. 1, causes the Web browser to send a document request 130 via the Internet to a Web server 122. In this exemplary embodiment of the invention, the request is a request for access to documents included in a list of documents. For example, the request may be of the form: http://<serverId>/<DocListId>/<Forms(or other type request)>/<Fields>/ and other data not relevant to this invention.

Upon receipt of the document request 130, the Web server opens the Web page and locates the document list data, i.e., DocListId. As more fully described below, the document list data is opened and a determination of the access level (called scope below) of each document on the list is determined. The logged on user access identification, i.e., U1, U2 . . . UN, is used to determine the access level or levels available to the user. The determined access level or levels (scopes) is used to filter the results of the document list access level determination to remove all access levels (scopes) not available to the user. Then the Web server 122 parses, e.g., extracts information from, the request generates one or more database queries, illustrated as SQL queries 134, using the extracted information. More specifically, the Web server builds a query that filters documents based on criteria chosen by the user and included in the original document request 130, plus the filtered access level data.

The database queries are then sent to the data server 124, which accepts queries composed in Structured Query Language (SQL) or a similar query language. In response to a query, the data server 124 selects database documents and returns the document data to the requester of the information, in this case the Web server. The returned document data identifies documents that meet the query criteria. Since the query criteria limits document identity to documents accessible to the requesting user, only documents available to the user that also meet other query criteria are identified. Next, the Web server composes return Web page document and embeds the document data returned by the data server into the composed Web page. Preferably, the composed Web page contains a list that identifies the documents that meet the query criteria. Also preferably, the document list forms links that allow the requestor to access the content of a specific document by "clicking" on the document in the list in a conventional manner.

Figure 2:
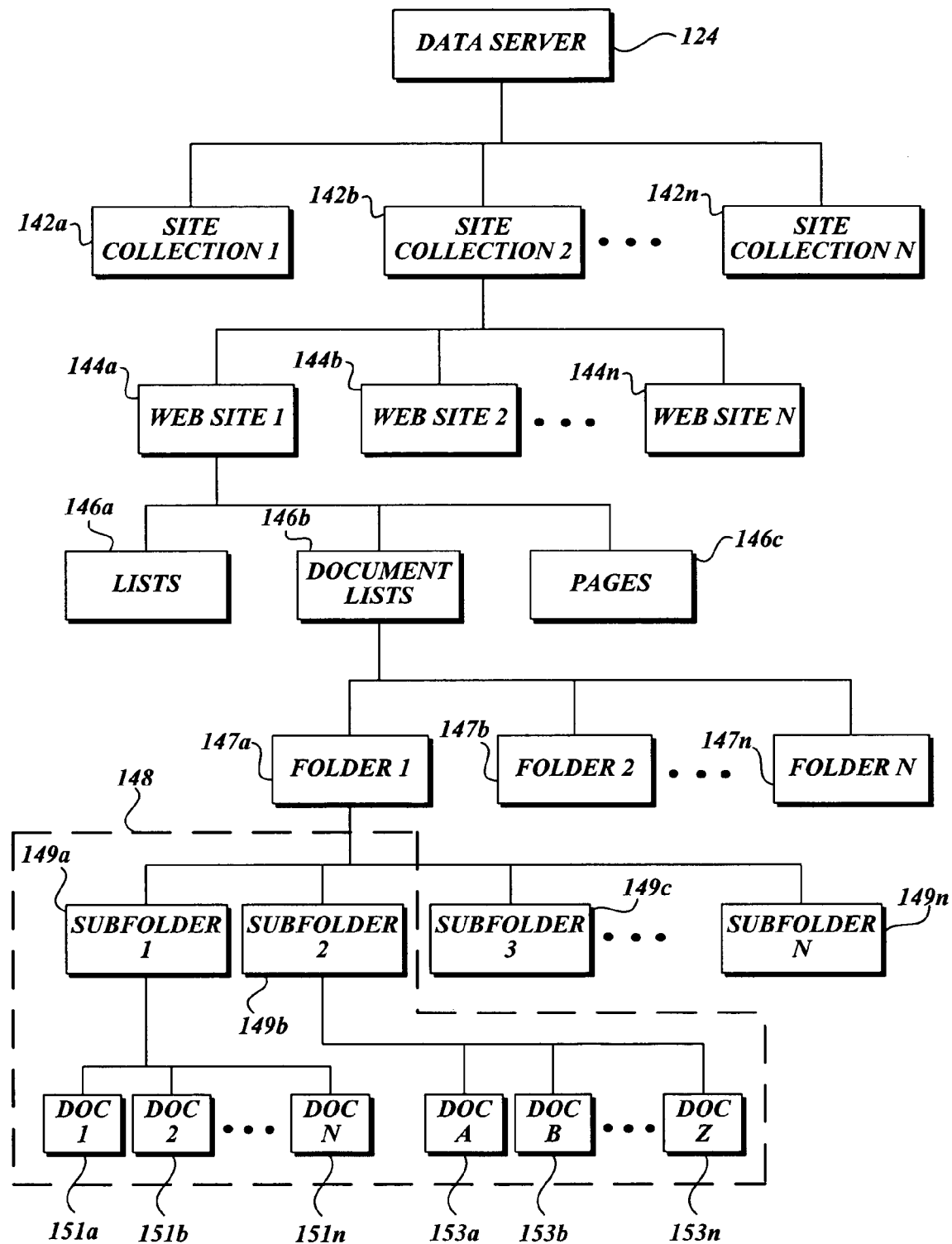
FIG. 2 is a tree diagram illustrating the concept of scope.

FIG. 2 is a tree diagram that illustrates how the data contained in the data server 124 is structured. At its upper level, this exemplary tree comprises a plurality of site collection nodes, 142*a*, 142*b*, . . . 142*n*, designated Site Collection 1, Site Collection 2, . . . Site Collection N. Each site collection node includes a plurality of Web site nodes. In order to avoid unduly complicating the drawing, FIG. 2 only illustrates the Web site nodes for Site Collection 2 142*b*, which are designated Web Site 1 144*a*, Web Site 2 144*b*, . . . Web Site N 144*n*. Each of the Web site nodes includes a plurality of other nodes. Again, in order to avoid unduly complicating the drawing, FIG. 2 illustrates only the nodes of Web Site 1 144*a*, which are designated Lists 146*a*, Document Lists 146*b*, and Pages 146*c*. The Document List node 146*b* includes a plurality of Folder nodes designated Folder 1 147*a*, Page 2 147*b* . . . Folder N 147*n*. Each of Folder nodes includes a plurality of sub-folder nodes. Only the sub-folder notes of the Folder 1 and Folder 2 nodes are illustrated in FIG. 2. The sub-folder nodes of Folder 1 are designated Sub-folder 1 149*a*, Sub-folder 2 149*b*, Sub-folder 3 149*c* . . . Sub-folder N 149*n*. In order to avoid unduly complicating the drawings, no Sub-folders (or documents) are illustrated in FIG. 2 for any of the other folders. Each of the Sub-folders includes a plurality of documents, such as Doc1 151*a*, Doc2 151*b* . . . DocN 151*n* for sub-folder 1 149*a* and DocA 153*a*, DocB 153*b* . . . DocZ 153*n* for sub-folder 2 149*b*. As will be readily appreciated by those skilled in the art, "document, or doc" is a relatively broad term. Document or doc generally defines a specific record that includes stored information. In the context of this invention, the "docs" depicted in FIG. 2 can be a text document, a pictorial or graphic document, or a combination that includes text, pictures, and/or graphics, or any other well known document type.

Data within the tree is accessed by referring to the set of nodes connected to the node containing the desired data. For example, the data server 124 can access the data in the node designated Sub-folder 1 by combining references to the nodes that are connected above the Sub-folder 1 node. Specifically, the Sub-folder 1 node is accessed by combining references to the Site Collection 2 node 142*b*, the Web Site 1 node 144*a*, the Document Lists node 146*b*, the Folder 1 node 147*a* and the Sub-folder 1 node 149*a*. Accessing the Folder 1 node accesses all sub-folders and documents included in the node unless expressly excluded using the hereinafter described scope criteria. If the Web server needs to access the documents included in Sub-folder 1, the Web server passes the data server 124 a message containing the previously listed combination of nodes. The data server uses the node references to access the documents included in Sub-folder 1 and returns the document data to the Web server.

As described above and shown in FIG. 2 the documents included in Folder 1 include Doc1 151*a*, Doc2 151*b* . . . DocN 151*n*, and the documents included in sub-folder 2 include DocA 153*a*, DocB 153*b*. . . DocZ 153*n*. Therefore, when Folder 1 is retrieved by the Web server 122 from the database server 124, all of these documents are also retrieved. It can also be seen in FIG. 2 that Sub-folder 1 and Sub-folder 2 are part of a group called a "scope" 148 which bounds the branches of the data tree structure that include Sub-folder 1, Sub-folder 2, and all of their included documents. A scope is group of one or more items in the tree that can then be referred to by using one reference, e.g., S1. This allows certain attributes, in this case access rights, to be applied to all items within the scope. Therefore, if certain attributes, i.e., access rights, are assigned to a scope, they are assigned to all members of the scope. For example, although Folder 1 also contains Sub-folder 3 and Sub-folder 4, only Sub-folder 1 and Sub-folder 2 are included in the scope 148. Scope 148 can have an attribute of inaccessibility or accessibility. Further, some items in a larger scope, such as scope 148, may be excluded, such as Doc B . . . Doc N, for example. In this example, only Doc 1 . . . Doc N and Doc A would be included in the scope.

In the prior art access control is provided using data from a Users table 200 shown in FIG. 5A and a Roles table 202 described above, and shown in FIG. 5B. The Roles table 202 identifies various user roles, designated R1, R2 . . . RN. Role R1 may identify any member of a team, and role R2 may identify the leader of the team, for example. A role is associated with a list of permissions that identify the document related activities a user is permitted to engage in, such as Read, Edit, Delete, Approve, ViewSource, ChangePermissions. This exemplary embodiment of the invention also includes a RoleAssignments table 204 shown in FIG. 5C, a Documents table 206 shown in FIG. 5E and Perms or Permissions table 208 shown in FIG. 5D. As shown in FIG. 4 preferably all five tables, i.e., the Users table 200, the Roles table 202, the RoleAssignments table 204, the Documents table 206 and the Perms table 208 are stored in the data server 124. As noted above, the Users table includes information 200 identifies users, U1, U2, U3 . . . UN and the Roles table includes information that identifies Roles, R1, R2 . . . RN. The RoleAssignments table 204 associates roles with users. Some users may be assigned more than one role. For example, the RoleAssignments shown in FIG. 5C associates user U1 only with role R1 whereas user U2 is associated with both role R1 and role R2. Also associated with each user/role combination in the RoleAssignments table, FIG. 5C, is a scope designation. The U1/R1 combination is associated with a scope designated S1, as is the U2/R1 combination. In contrast, the U2/R2 combination has a scope designated S2.

The Documents table 206, (FIG. 5E) is, in effect, a metadata table that associates documents, D1, D2 . . . DN with conventional information about the documents (blank center column), plus the scope (access rights) accorded to the document, S1, S2 . . . SN. As well known to those skilled in the art, a document is any self-contained piece of work created with an application program. If saved on disk, a document is given a unique file name by which it can be retrieved. In addition to a letter or report, documents include spreadsheets, graphics, etc. In essence, a document is any user created work that is named and saved as a separate file. As well known to those skilled in the art, databases store information about the documents stored in the database. This information is commonly described as metadata.

If the scope S1 is the scope 148 pictured in FIG. 2, all of the documents falling within the scope S1 have the same scope "value," i.e., S1. If U1 has an association with role R1 at scope S1 in the RoleAssignments table, the user represented by U1 has the permission P1 associated with R1. Conversely, if U1 does not have a reference to S1 in the RoleAssignments table, the user represented by U1 does not have access to documents falling within scope S1. As depicted in FIG. 5C, both U1 and U2 have some permissions to documents within scope S1, U2 also has some permissions to documents within scope S2. "Nested" documents fall within the scope of a primary document, unless the nested documents have a different scope. The foregoing approach to access control makes it possible to control user access to both many (i.e., tens of thousands) and few documents. All that is required is that a requesting user have the scope accorded to a document.

Figure 3:
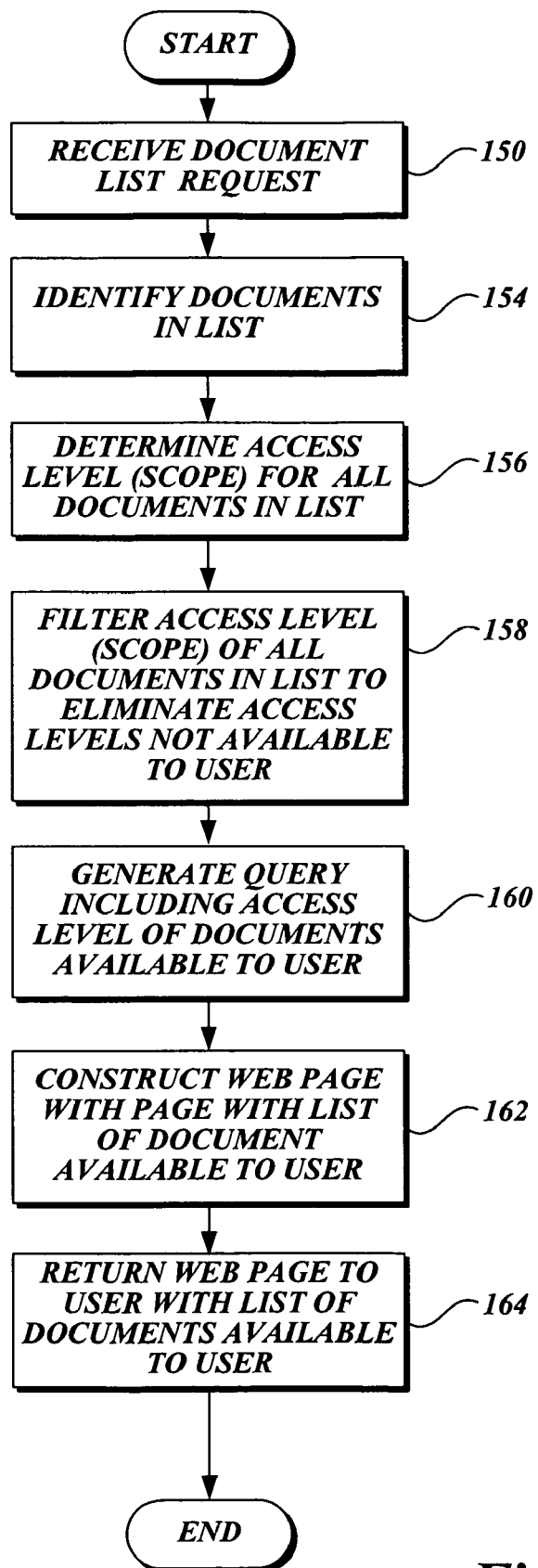
FIG. 3 is a flow diagram illustrating an exemplary Web server response to a client browser request.

The flow diagram in FIG. 3 illustrates how an exemplary Web server, e.g., Web server 122 shown in FIG. 1, responds to a request from Web browser. The request from the Web browser is received by the Web server at block 150. As noted above, in this exemplary embodiment of the invention, the request is in the form: http ://<serverId>/<DocListId>/<Forms(or other type request)description>/<Fields>/ and other data not relevant to this invention. At block 154 the Web server 122 opens the DocListId and uses the extracted information to identify the documents in the list by checking the Document Lists 146b (or other appropriate) storage node in the database server. At block 156, the Web server 122 determines the scopes (access levels) for all documents in the list (e.g., S1, S2, S4, S6 . . . ). Next, at block 158 the scopes list is filtered to eliminate any scopes not available to the requestor by comparing the permissions needed for a requested operation and the permissions the user has within the scopes afforded by the user's role.

At block 160, a query (designated a SQL with filters 134 query in FIG. 1) is generated and sent to the data server 124. The query is generated in a manner known to those skilled in the art and includes any "filtering" items contained in the original user request 130. Such filtering may, for example, limit documents to those produced after a specific date, or those related to a particular type of employee, etc. As well known to those skilled in the art, any data "field" can be filtered such that only data included in the field having a certain attribute, such as all employees whose last name begins with B, for example, is included in a data return. In addition, entire data fields can also be filtered out by being excluded in the query. Since SQL and other database queries are well known to those skilled in the art, such queries are not further described here, except to note that one of the "filters" included in the SQL with filters query employed in this exemplary embodiment of the invention is the filtered scope list.

At block 162, a Web page is constructed that includes a list of all the documents identified by the data server 124 in response to the query. At block 164, the constructed Web page is sent to the user. After opening the Web page, the user can retrieve documents by "clicking" on the documents in the list. Depending on implementation, these documents can be retrieved as part of the query response and attached to the constructed Web pages. Alternatively, the listed documents can form links to documents stored in the data server 124, or some other Web site data server.

In some instances, it may be desirable to place limits on the number of documents provided in response to a query to some predetermined number, such as 50 or 100, before constructing the Web page. In such instances, multiple queries from the Web server to the data server and multiple responses, i.e., multiple round trips, will be required.

Prior to the present invention, the Web server 122 was required to request information (metadata) about each document, on a document by document basis. In response, the data server 124 returned data associated with the document, including the access rights accorded to the document to the Web server. The Web server 122 extracted the access rights information from the document data and determined if the document access rights compared to the user's access rights. If the access rights compared, the document was added to the document list to be returned. If the access rights did not compare, the document was not added. Obviously, the time spent in the latter type of trip to and from the data server is wasted. Moreover, a lower level or nested document cannot be requested until it is determined that the containing document is itself user accessible. It can be seen that this process is exceedingly time consuming. An even less efficient prior art approach is to (i) extract the access rights associated with the requesting user U1; (ii) for each access right, retrieve the documents within that access right, and (iii) eliminate previously retrieved documents from the list of documents to be included in the return Web page. This approach suffers from likely having to abandon even more data.

This invention overcomes the foregoing disadvantages by retrieving the access rights of all requested documents in one round trip. The invention is further optimized through the use of the Perms table 208 which reduces data duplication when many documents share the same scope. The invention uses a RoleAssignments table 204 and a Perms table 208, examples of which are shown in FIGS. 5C and 5D, and uses document scope to determine whether or not to return document data. The RoleAssignments table associates users with roles and scopes and the Perms or Permissions table associates users directly with scopes. As users request documents, the Perms table is used to quickly associate users with the scopes the users are allowed to access in one round trip. The use of scopes allows, in most instances, a single query to be generated to retrieve documents of the appropriate scope.

As in the prior art, the Web server uses the user reference, U1, to determine if a document, such as D1, should be made available to the user. However, unlike the prior art, this determination is made using the Perms table shown in FIG. 5D. More specifically, rather than using the multiple round trips described above, the Web server 122 submits a single request that results in information about all of the scopes associated with documents included in the DocListId description contained in the original user request 130. The returned scope list is limited to scopes associated with users stored in the Perms table. The result is used to add a filter to the query built by the Web server. The Web server 122 query to the data server 124 thus requests only document data deemed to be accessible to the requesting user. Unlike the prior art, the invention avoids multiple data round trips, thereby improving performance.

While the information in RoleAssignment, the Perms and other tables needs to be updated from time to time, such updating time is substantially less than the time required by a large number of Web server-database server round trips. Those skilled in the art will appreciate that the access time is proportional to the number of Perms table scopes, as opposed to being proportional to the number of database items.

While the illustrated and described exemplary embodiment of the invention is employed in a three-tiered Web page serving system, i.e., a system that includes a Web browser, a Web server, and a data server, this arrangement should not be construed as limiting upon the present invention. For example, while the data server and the Web server are depicted as separate computing devices, both may reside on the same physical device. Further, while the described embodiment of the invention as been discussed as implemented using SharePoint software running on a Microsoft Windows® operating system, it is to be understood that the invention is also applicable to other products and other operating systems.

While the described criteria used to control document or document item access has been described as security data, it is to be understood that other selection criteria can be used. Thus, the employment of security criterion should not be construed as limiting upon the present invention. The invention may also be applied to cellular telephones or personal digital assistants (PDAs) to trim access to information using such devices. Further, while the database access language employed in the above-described exemplary embodiment of the invention is SQL, other such languages may be used. Thus, the use of SQL should not be construed as limiting upon the present invention.

In summary, while an exemplary embodiment of the invention has been illustrated and described, those skilled in the art will appreciate that various changes can be made therein without departing from the spirit and scope of the invention, as defined by the appended claims.

The embodiments of the invention in which an exclusive property or privilege is claimed are defined as follows:

1. A method of accessing data stored in one or more database servers to control access to documents requested by a user, comprising;
    receiving, at a server, a request from the user for access to one or more documents;
    retrieving from the one or more database servers, in a single operation, an access level associated with each of the one or more documents;
    identifying one or more predefined access levels granted to the user;
    generating a list of the one or more documents and the respective associated access level information;
    filtering the list to eliminate one or more of the requested documents having access levels not available to the user;
    generating one or more database server queries based on the filtered list of requested documents;
    retrieving document data associated with each respective document based on the filtered list of requested documents from the one or more database servers, wherein the document data is organized in a document tree list architecture; and
    reporting the retrieved document data to the user.

2. A method according to claim 1, further comprising transferring the one or more database queries to the one or more database servers including a filter that filters out data associated with requested documents whose access level is not available to the user.

3. A method according to claim 1, further comprising generating the request for access to the one or more documents using a Web browser.

4. A method according to claim 1, wherein an access level is an attribute specifying access rights to one or more documents.

5. A method according to claim 1, wherein the document data is accessed in the document tree list architecture by referring to one or more nodes connected to a node containing the desired document data.

6. A method according to claim 1, wherein the user is pre-assigned:
    a user identification;
    one or more user roles, wherein each user role includes one or more associated access levels; and
    a permission for each access level defined by the user role.

7. A method according to claim 6, wherein filtering the list to eliminate one or more of the requested documents having an access level not available to the requesting user comprises:
    comparing the permission needed to access a respective document and the pre-assigned permission for each access level defined by the user role.

8. A method according to claim 1, wherein reporting the retrieved document data to the requesting user comprises:

assembling a Web page listing all of the document data retrieved by the one or more database queries; and transferring the Web page to the requesting user.

9. A method according to claim 8, wherein the retrieved document data is attached to the assembled Web page.

10. A method according to claim 8, wherein the retrieved document data is linked to the one or more data base servers.

11. A computer-readable storage medium comprising instructions that, when executed by a computer, perform a method of accessing data stored in one or more database servers to control access to documents requested by a user, comprising:

receiving, at a server, a request from a user for access to one or more documents;

retrieving from the one or more database servers, in a single operation, an access level associated with each of the one or more documents;

identifying one or more predefined access levels granted to the user;

generating a list of the one or more documents and the respective associated access level information;

filtering the list to eliminate one or more of the requested documents having access levels not available to the user;

generating one or more database server queries based on the filtered list of requested documents;

retrieving document data associated with each respective document based on the filtered list of requested documents from the one or more database servers, wherein the document data is organized in a document tree list architecture; and reporting the retrieved document data to the user.

12. The computer-readable storage medium of claim 11, further comprising transferring the one or more database queries to the one or more database servers including a filter that filters out data associated with requested documents whose access level is not available to the requesting user.

13. The computer-readable storage medium of claim 11, further comprising generating the request for access to the one or more documents using a Web browser.

14. The computer-readable storage medium of claim 11, wherein an access level is an attribute specifying access rights to one or more documents.

15. The computer-readable storage medium of claim 11, wherein the document data is accessed in the document tree list architecture by referring to one or more nodes connected to a node containing the desired document data.

16. The computer-readable storage medium of claim 11, wherein the user is pre-assigned:

a user identification;

one or more user roles, wherein each user role includes one or more associated access levels; and a permission for each access level defined by the user role.

17. The computer-readable storage medium of claim 16, wherein filtering the list to eliminate one or more of the requested documents having an access level not available to the requesting user comprises:

comparing the permission needed to access a respective document and the pre-assigned permission for each access level defined by the user role.

18. The computer-readable storage medium of claim 11, wherein reporting the retrieved document data to the requesting user comprises:

assembling a Web page listing all of the document data retrieved by the one or more database queries; and transferring the Web page to the requesting user.

19. A computer-readable storage medium according to claim 18, wherein the retrieved document data is attached to the assembled Web page.

20. A computer-readable storage medium according to claim 18, wherein the retrieved document data is linked to the one or more data base servers.

21. A method of accessing data stored in one or more database servers to control access to documents requested by a user, comprising;

receiving, at a server, a request from the user for access to one or more documents, wherein the request for access to one or more documents is generated by a Web browser;

retrieving from the one or more database servers, in a single operation, an access level associated with each of the one or more documents, wherein an access level is an attribute specifying access rights to one or more documents;

identifying one or more predefined access levels granted to the user, wherein the user is pre-assigned a user identification, one or more user roles including one or more associated access levels, and a permission for each access level defined by the user role;

generating a list of the one or more documents and the respective associated access level information;

filtering the list to eliminate one or more of the requested documents having an access level not available to the user, the filtering including a comparison of the permission needed to access a respective document and the pre-assigned permission for each access level defined by the user role for the user;

generating one or more database server queries based on the filtered list of requested documents, wherein the one or more database queries are transferred to the one or more database servers including a filter that filters out data associated with requested documents whose access level is not available to the requesting user;

retrieving document data associated with each respective document based on the filtered list of requested documents from the one or more database servers, wherein the document data is organized in a document tree list architecture, wherein the document data is accessed in the document tree list architecture by referring to a one or more nodes connected to a node containing the desired document data; and reporting the retrieved document data to the requesting user, including:

assembling a Web page listing all of the document data retrieved by the one or more database queries; and transferring the Web page to the requesting user.

* * * * *